Nov. 24, 1964
R. L. WAYLAND, JR
3,158,501
WRINKLE RESISTANT FABRIC AND METHOD
Filed Dec. 10, 1956
CELLULOSE FABRIC IMPREGNATED WITH A 1,3 DI-METHYLOL TETRAHYDRO-2-(1)- PYRIMIDONE
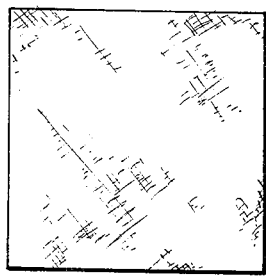
CELLULOSE FABRIC IMPREGNATED WITH A 1,3 DIMETHYLOL TETRAHYDRO-2-(1)- PYRIMIDINETHIONE
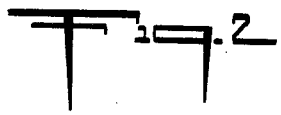
INVENTORS,
ROSSER LEE WAYLAND JR,
BY *Fisher & Christen*
ATTORNEYS

United States Patent Office 3,158,501
Patented Nov. 24, 1964

3,158,501
WRINKLE RESISTANT FABRIC AND METHOD
Rosser L. Wayland, Jr., Danville, Va., assignor to Dan River Mills, Incorporated, Danville, Va., a corporation of Virginia
Filed Dec. 10, 1956, Ser. No. 627,461
7 Claims. (Cl. 117—139.4)

The present invention relates generally to the manufacture of wrinkle resistant textile fabrics.

This application is a continuaion-in-part of application Serial No. 385,719, filed October 12, 1953, now abandoned, for Wrinkle Resistant Fabric and Method.

This invention is more particularly related to the manufacture of certain pyrimidones and pyrimidinethiones, their 1,3-dimethylol derivatives and the application of their dimethylol derivatives to cellulosic fabrics to produce wrinkle resistance.

This invention includes several separate phases, each of which will be considered separately for purposes of clarity and convenience in the following order:

(1) Methods of manufacturing the tetrahydro-2(1)-pyrimidones and the tetrahydro-2(1)-pyrimidinethiones.

(2) The 1,3-dimethylol tetrahydro-2(1)-pyrimidones and the 1,3-dimethylol tetrahydro-2(1)-pyrimidinethiones, as products, and the methods of their manufacture.

(3) The resinous formaldehyde condensation products of the tetrahydro-2(1)-pyrimidones and the tetrahydro-2(1)-pyrimidinethiones and the methods of their manufacture.

(4) Wrinkle resistant cellulosic textile fabrics and the methods of their manufacture.

The invention will be better understood if considered in connection with the accompanying drawings, in which:

FIG. 1 is a diagramatic representation of wrinkle resistant cellulosic fabric impregnated with a 1,3-dimethylol tetrahydro-2(1)-pyrimidone, and FIG. 2 is a digramatic view of a wrinkle resistant fabric impregnated with 1,3-dimethylol tetrahydro-2(1)-pyrimidinethione.

The treated fabrics of FIGS. 1 and 2 appear the same as an untreated fabric, insofar as the drawings are concerned, as the impregnating materials are deposited in and on the fabric in a manner which is not visible to the naked eye.

METHODS OF MANUFACTURING THE TETRAHYDRO-2(1)-PYRIMIDONES AND THE TETRAHYDRO-2(1)-PYRIMIDINETHIONES

The unsubstituted tetrahydro-2(1)-pyrimidone has been described in the prior art, but no really satisfactory method for manufacturing the product has been available prior to this invention. Likewise, the unsubstituted tetrahydro-2(1)-pyrimidinethione is known in the prior art, but no satisfactory method for its manufacture has been available.

One of the important objects of this invention is to provide methods of manufacturing not only the unsubstituted pyrimidones and pyrimidinethiones, but also the 4, 5 and/or 6 substituted products corresponding to the following structural formula:

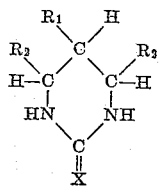

wherein $R_1$ may be hydrogen, hydroxy or lower alkyl, $R_2$ may be hydrogen or lower alkyl and X may be oxygen or sulfur.

It has now been found that this object can be obtained by reacting a 1,3-diaminoalkane with either urea, thiourea, alkyl ureas or alkyl thioureas under the influence of heat without catalysts. Obviously, 2,4-diaminoalkanes, 3,5-diaminoalkanes, etc., may be used in place of the 1,3-diaminoalkanes in those instances where both the 4 and 6 positions of the final products have lower alkyl groups. The reaction may be carried out in an excess of the amine or in the presence of an inert solvent. The reaction appears to take place in two stages; one in which the urea reacts with the 1,3-diaminoalkane to form intermediate products of undetermined constitution which are normally solid at the boiling point of most 1,3-diaminoalkanes, and a second stage, preferably carried out at a higher temperature. The second stage of the reaction continues until the desired product is obtained in almost theoretical yields.

Thus, to obtain unsubstituted tetrahydro-2(1)-pyrimidone, one reacts 1,3-diaminopropane with either urea or a lower alkyl derivative of urea. Similarly, to obtain unsubstituted tetrahydro-2(1)-pyrimidinethione, one reacts 1,3-diaminopropane with either thiourea or a lower alkyl derivative of thiourea.

To obtain the 4, 5 and/or 6 substituted pyrimidones and pyrimidinethiones, it is necessary to use 1,3-diaminoalkanes other than 1,3-diaminopropane. For example, 1,3-diaminobutane reacted with urea will produce 4-methyl tetrahydro-2(1)-pyrimidone, whereas, reacting 2,4-diaminopentane with urea will produce 4,6-dimethyl tetrahydro-2(1)-pyrimidone. Similarly, reacting 2-hydroxy 1,3-diaminopropane with urea will produce 5-hydroxy tetrahydro-2(1)-pyrimidone. Again, 4 ethyl, 3,5-diamino-n-heptane reacted with urea produces 4,5,6-triethyl tetrahydro-2(1)-pyrimidone.

According to the preferred method of manufacture in accordance with this invention, the diaminoalkane is first dissolved in an inert solvent which boils at a high temperature in the range of about 190° to 300° C., after which an equal molar quantity of urea or its equivalent is added and the mixture is heated. The reaction temperature should be at the boiling point of the diaminoalkane for a limited period of time or until the first state of the reaction is complete. The initial heating should be carried out under reflux conditions to avoid loss of amine. If this method is used, the inert solvent should be one which is compatible with conditions chosen for the next use of the product. For example, if the product is a pyrimidone which is to be reacted with aqueous formaldehyde to form the dimethylol derivaitve, it is preferable to use a water miscible solvent, such as ethylene glycol, propylene glycol, butylene glycol, diethylene glycol, glycerol, 1,4-butanediol, polyglycol 15–200, diethylene glycol monoethyl ether, diethylene glycol monobutyl ether, bis(beta-hydroxyethyl) sulfide, diethylene glycol diethyl ether, 1,3-butanediol, 2,3-butanediol, methyl carbitol or triethylene glycol.

For other purposes, other organic solvents which are not water miscible may be used. The solvent should have a boiling point above that of the diaminoalkane, so that the second stage of the reaction may be carried out at a relatively high temperature in the nature of at least about 220 to 230° C. The second stage of the reaction involves ring formation with the evolution of ammonia which must be removed.

A second method of manufacturing these products and the preferred method in those instances in which it is desired to obtain a pure crystalline product utilizes the same reactants without an inert solvent. In those instances it has been found desirable to carry out the first stage of the reaction in the presence of the excess of the amine and to carry out the second stage of the reaction above the melting point of the final product and the intermediate product. Thus, for example, when urea is reacted with 1,3-diaminopropane to form tetrahydro-2(1)-pyrimidone, 1½ mols of 1,3-diaminopropane may be provided for each mol of urea. The first stage of the reaction is then carried out at the boiling point of the amine, namely, at about 135° C. Towards the end of the first stage of the reaction, the excess amine is boiled off and the resulting product is a solid. The reaction temperature is raised to carry out the second stage at a temperature above the melting point of the tetrahydro-2(1)-pyrimidone. A suitable temperature for this second reaction is about 270° C.

Inasmuch as the reaction of the 1,3-diaminoalkane and the substituted or unsubstituted urea or thiourea always involves equal molar quantities of each reactant, one way of testing to be sure the reaction is complete is to measure the amount of ammonia evolved, as two mols of ammonia are evolved from a single mol of the reactants before the reaction is complete. Another method of assuring that the reaction is complete is to recrystallize the product from ethanol and check the melting point.

This phase of the invention will be better understood by reference to the following typical examples:

*Example 1*

Unsubstituted tetrahydro-2(1)-pyrimidone was prepared by heating one mol of urea with as light excess of 1,3-diaminopropane at the boiling temperature of the amine (135.5° C.). After about an hour, a solid was formed and the temperature was raised to about 270° C. A clear melt was obtained which solidified on cooling to a mass of crystals having a melting point of between 250° and 260° C. On recrystallization from ethanol, the product assumed the form of white prisms having a melting point of 262° C.

*Example 2*

Unsubstituted tetrahydro-2(1)-pyrimidone was prepared by heating 20 mols of urea with about 20 mols of 1,3-diaminopropane in about 20 mols of a water miscible solvent, ethylene glycol, at a rate such as to give a slow but steady reflux. The temperature of reflux rose from about 135° C. at the start of the reaction to 160° C., after 2 hours. At the end of 6 hours the temperature of reflux had risen to about 220° C. and the reaction was complete. The clear solution was cooled, and the product precipitated as almost white needles. (A few of the crystals were removed from the reaction flask, recrystallized from water and identified as the same material obtained in Example 1.)

*Example 3*

The 4-methyl tetrahydro-2(1)-pyrimidone was prepared by heating 2 mols of urea with 2 mols of 1,3-diaminobutane in about 1.6 mols of ethylene glycol. The heating was carried out at a relatively slow rate, such as to give a slow but steady reflux. After about 3 to 4 hours (with some vapor removal towards the end of the reaction) the temperature had risen to about 240° C. and the reaction was complete. Upon cooling, the product became a crystalline mass. A small portion of this product was purified with isopropanol and found to have a melting point of 196–199° C.

*Example 4*

The 5-hydroxy tetrahydro-2(1)-pyrimidone was prepared by heating 2 mols of 1,3-diaminopropanol-2 with 2 mols of urea in 1.6 mols of ethylene glycol. The heating was carried out at a relatively slow rate, such as to give a steady reflux. After about 3 to 4 hours (with some vapor removal towards the end of the reaction), the temperature had risen to about 220° C. and the reaction was complete. Upon cooling, the product became a crystalline mass. A small portion of this crystalline product was purified with isopropanol and found to have a melting point of about 205–207° C.

*Example 5*

A mixture of 14.8 g. (0.2 mole) of methyl urea and 14.8 g. (0.2 mole) of 1,3-diaminopropane was heated under reflux for one hour. At the end of this time solids had formed in the reaction mixture. Ten grams of ethylene glycol was added and the heating was continued to a final temperature of 220° C. at which point a clear solution was obtained. The product, which precipitated on cooling the reaction mixture, was washed with petroleum ether and acetone and dried. The white crystalline product melted at 259–263° C. and a mixture melting point with authentic tetrahydro-2(1)-pyrimidone showed no depression.

*Example 6*

A mixture of 29.6 g. (0.4 mole) of 1,3-diaminopropane, 30.4 g. (0.4 mole) of thiourea and 30.0 g. of ethylene glycol was heated over a period of two hours under reflux to a final temperature of 210° C. with some vapor escape toward the end of the reaction period. The reaction mixture was bright green near the start of the reaction but became light yellow as the reaction continued. On cooling the reaction mixture the product precipitated as white crystals and was filtered and recrystallized from isopropanol. The purified product melted at 207–209° C. and a mixture melting point with authentic tetrahydro-2(1)-pyrimidine-thione, prepared from 1,3-diaminopropane and carbon disulfide showed no depression.

Thus, it will be seen that in this phase of the invention there is provided a simple and economical method of producing tetrahydro-2(1)-pyrimidones and tetrahydro-2(1)-pyrimidinethiones, which may be subsequently reacted with formaldehyde to produce useful products. If reacted with 2 mols of formaldehyde under alkaline conditions, the 1,3-dimethylol derivatives are formed and these products are useful for producing wrinkle resistance in cellulosic fabrics, as will be more fully explained hereinafter.

If reacted with formaldehyde under acidic conditions, the resulting product is a resinous condensation product which is useful for the same purposes.

THE 1,3 - DIMETHYLOL TETRAHYDRO-2(1)-PYRIMIDONES AND THE 1,3-DIMETHYLOL TETRAHYDRO - 2(1) - PYRIMIDINETHIONES, AS PRODUCTS, AND THE METHODS OF THEIR MANUFACTURE

The primary object of this phase of the invention is the provision of water soluble resin forming materials which are useful for producing wrinkle resistance in textile fabrics, namely, the 1,3-dimethylol tetrahydro-2(1)-pyrimidones and the 1,3-dimethylol tetrahydro-2(1)pyrimidinethiones. At this point it should be noted that there is a distinct difference in the pyrimidones and the pyrimidinethiones, in that while both products are useful for producing wrinkle resistance in cellulosic fabrics, the dimethylol derivatives of the pyrimidones have the distinct advantage of producing fabrics which have a high degree of resistance to damage from retained chlorine. The dimethylol derivatives of the pyrimidinethiones do not appear to possess this highly desirable characteristic. A further difference is that the pyrimidones produce a considerably higher degree of wrinkle resistance than do the pyrimidinethiones.

Manufacture of the 1,3-dimethylol tetrahydro-2(1)-pyrimidones and the 1,3-dimethylol tetrahydro-2(1)-pyrimidinethiones having the structural formula:

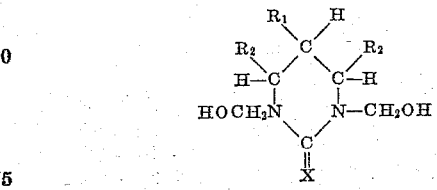

wherein $R_1$ may be hydrogen, hydroxy or lower alkyl, $R_2$ may be hydrogen or lower alkyl and X may be oxygen or sulfur, may be accomplished in accordance with this invention by reaction of two mols of formaldehyde with 1 mol of a tetrahydro-2(1)-pyrimidone or a tetrahydro-2 (1)-pyrimidinethione under alkaline conditions. Generally, the reaction mixture is gently heated to assure complete reaction. As soon as no substantial formaldehyde remains, the reaction is complete.

The resulting solution of a 1,-dimethylol tetrahydro-2(1)-pyrimidone or 1,3-dimethylol tetrahydro-2(1)-pyrimidinethione is preferably neutralized to assure standard textile treatment or other use and to permit easy acid catalysis on fabrics impregnated therewith. This phase of the invention will be better understood by reference to the following typical examples:

Example 7

100 parts (1 mol) of the newly formed unsubstituted tetrahydro-2(1)-pyrimidone of Example 1 were added to 162 parts (2 mols) of formaldehyde (37%) containing 0.4 part of sodium hydroxide, (pH of mixture=10.0) with stirring. After a period of 80 minutes the pyrimidone had completely dissolved. The solution was allowed to stand for 4.5 hours after the pyrimidone dissolved and then neutralized to pH 7.0 with hydrochloric acid. The resulting solution of 1,3-dimethylol tetrahydro-2,(1)-pyrimidone was a clear colorless liquid characterized by a very faint odor of formaldehyde, infinite water solubility, and extremely high stability and shelf life.

Example 8

The procedure of Example 7 was followed except that 1.0 part of potassium carbonate was used in place of 0.4 part of sodium hydroxide. The product appeared on standard tests to be the same as the product of Example 7.

Example 9

The procedure of Example 7 was followed except that 1.0 part of triethylamine was used in place of 0.5 part of sodium hydroxide. The product appeared on standard tests to be the same as the product of Example 7.

Example 10

The procedure of Example 7 was used except that 2.5 parts of sodium hydroxide was used instead of 0.5 part, and the product was neutralized with sulfuric acid rather than hydrochloric. The product appeared on standard tests to be the same as the product of Example 7.

Example 11

The product of Example 7 was evaporated to two-thirds of its original volume at a temperature of about 60° C. and a pressure of approximately 20 mm. This concentrated solution was then chilled in an ice bath until white crystals formed. The crystals of 1,3-dimethylol tetrahydro-2(1)-pyrimidone were obtained as white needles melting at 104–106° C. after filtration, washing with cold dioxane and drying.

Example 12

The product of Example 7 was brought to pH 1.0 with hydrochloric acid and allowed to remain at this pH for 2 hours at a temperature of 30° C. and then brought back to a pH of 7.0 with NaOH. The product was a clear solution slightly more viscous than that of Example 7, but otherwise having the same physical properties.

Example 13

Forty mols of formaldehyde were added to the slurry of crystals of unsubstituted tetrahydro-2(1)-pyrimidone obtained in Example 2, with 0.2 mol sodium hydroxide. The temperature of the mixture was raised to about 60° C. until a clear solution was obtained and held at this temperature for 30 minutes to asure complete reaction. The solution of 1,3-dimethylol tetrahydro-2(1)-pyrimidone was cooled and brought to pH 7 with hydrochloric acid. The product was a slightly yellow liquid, a litle more viscous than water and possessing the same characteristics as the product of Example 7.

Example 14

To the unsubstituted tetrahydro-2(1)-pyrimidone produced in accordance with Example 5, there was added 37.2 g. (0.4 mol) of formaldehyde (37%) to which had been previously added enough sodium hydroxide to bring the solution to pH 10. This was warmed gently to about 60° C. until a clear solution was obtained and held at this temperature for about 30 minutes. The resulting solution of 1,3-dimethylol tetrahydro-2(1)-pyrimidone was cooled and brought to pH 7 with hydrochloric acid. The product was a slightly yellow liquid, a little more viscous than water and having the same characteristics as the product of Example 7.

Example 15

To 1 mol of the unsubstituted tetrahydro-2(1)-pyrimidine-thione prepared in accordance with Example 6, there was added 2 mols of formaldehyde (in the form of 37% solution) which had previously been brought to pH 10 with sodium hydroxide. This mixture was heated to about 60° C. until a clear solution was obtained and maintained that temperature for about 30 minutes to assure complete reaction. The resulting solution of 1,3-dimethylol tetrahydro-2(1)-pyrimidinethione was cooled and brought to pH 7 with hydrochloric acid. The product was a slightly yellow liquid, a little more viscous than water and having the same characteristics as the products of the preceding examples.

Example 16

Four mols of formaldehyde were added to 2 mols of the crystalline material as made in Example 3, which material was slurried in water along with enough sodium hydroxide to obtain about pH 11. This mixture was warmed until clear and maintained between about 90° and 100° C. for about one hour. After cooling, enough water was added to obtain a product of 50% solids and the pH was adjusted to about 7.2 with hydrochloric acid. The product was 1,3-dimethylol, 4-methyl-tetrahydro-2 (1)-pyrimidone in water and ethylene glycol and it was similar in appearance to the product of Example 1.

Example 17

Four mols of formaldehyde were added to the crystalline mass from Example 4, which material was slurried in water with enough sodium hydroxide to obtain about pH 11. The mixture was warmed until the crystals were dissolved and a clear solution was obtained and then maintained at between about 90° and 100° C. for about one hour. After cooling, enough water was added to obtain a product of 50° solids and the pH was adjusted to about 7.2 with hydrochloric acid. This product was 5-hydroxyl-1,3-dimethylol tetrahydro-2(1)-pyrimidone in water and ethylene glycol and it was similar in appearance to the product of Example 1.

All of the 1,3-dimethylol-pyrimidones and 1,3-dimethylol-pyrimidinethiones made in accordance with this phase of the invention were water soluble resin-forming materials suitable for impregnation for cellulosic fabrics to produce wrinkle resistance. The products appear to have good stability and good shelf life. They may be used alone or in combination with other resin-forming materials, or in combination with various other textile agents, such as wetting agents, stiffening agents, water-proofing materials, softeners, starch, etc. The methods of applying these products to textile fabrics will be more fully described hereinafter.

THE RESINOUS FORMALDEHYDE CONDENSATION PRODUCTS OF THE TETRAHYDRO-2(1)-PYRIMIDONES AND THE TETRAHYDRO-2(1)-PYRIMIDINETHIONES AND THE METHODS OF THEIR MANUFACTURE

One of the important objects of this phase of the invention is the provision of resinous condensation of products useful for making cellulosic fabrics wrinkle resistant, stiffening textile materials, paper treating materials, and the like. Generally, the objects of this phase of the invention are accomplished by reacting the tetrahydro-2(1)-pyrimidones and/or the tetrahydro-2(1)-pyrimidinethiones with formaldehyde under acid conditions for a predetermined time and at a predetermined temperature in accordance with the desired end product. These products can also be obtained by acidifying the 1,3-dimethylol products produced in accordance with Examples 7–15 as is illustrated in Example 12. For the more direct approach, the following typical examples will illustrate the preferred embodiments of this phase of the invention:

Example 18

One mol of unsubstituted tetrahydro-2(1)-pyrimidone was added to 2 mols of formaldehyde (37%) containing 0.01 mol of HCl (pH of solution=1.0). After 20 minuates the temperature had risen from 27° C. to 45° C. and all of the pyrimidone had dissolved. The reactants were allowed to react for a total of 2 hours, then brought to pH 7 with NaOH. The product was a clear liquid having a Saybolt viscosity of 2 min. 30 sec.

Example 19

The procedure of Example 16 was followed except that the reaction time was reduced to 1 hour. The product was most similar to that of Example 8 except that its Saybolt viscosity was 1 min. 45 sec.

These same conditions of Examples 17 and 18 have been used with equal facility with the other pyrimidones and pyrimidinethoines of this invention with substantially identical results.

It will be understood by those skilled in the art that the degree of polymerization of these products is the function of the pH, the time and the temperature of the reaction and that the polymerization can be controlled so as to produce products of varying viscosities. The application of these products to textile for stiffening purposes, as well as for imparting wrinkle resistant characteristics, will be described more fully hereinafter.

WRINKLE RESISTANT CELLULOSIC TEXTILE FABRICS AND THE METHODS OF THEIR MANUFACTURE

This phase of the invention particularly relates to the application of the reaction products of formaldehyde and either tetrahydro-2(1)-pyrimidones or tetrahydro-2(1)-pyrimidinethiones to cellulosic fabrics, particularly cotton fabrics, to produce high wrinkle resistance. More especially, it relates to the application of the water soluble 1,3-dimethylol tetrahydro-2(1)-pyrimidones to cellulosic fabrics, particularly cotton fabrics, to produce high wrinkle resistance without limiting the normal utility of the fabrics. This is of particular significance in relation to the reduction of damage from retained chlorine in treated fabrics.

In the textile chemical industry, it is now a generally accepted fact that the water soluble methylol derivatives of aminoplast resin forming materials are the most satisfactory products for treatment of cotton, viscose rayon, and linen fabrics to produce wrinkle resistance. Most commercial products falling in this category are either the methylol ureas, the methylol melamines, or dimethylol imidazolidone-2.

Yet each of these products has certain disadvantages which tend to limit its utility. Each tends to reduce the tear strength of treated fabrics by an amount inversely proportional to the degree of wrinkle resistance obtained, but some show greater strength loss for a given degree of wrinkle resistance than others. Dimethylol urea is known to be at the lower end of the scale in this respect and, while some better, dimethylol imidazolidone-2 leaves much to be desired.

It is generally known in the art that textile fabrics treated fabrics treated with any one of these commercial resin-forming materials have a tendency to pick up or retain chlorine from commercial bleaches. This phenomenon, commonly called "chlorine retention," is most detrimental to urea formaldehyde treated fabrics because the heat of ironing liberates hydrochloric acid which is very deleterious to the fabric and sometimes causes complete fabric disintegration. The same property, though to a lesser degree, is noted in fabrics treated with dimethylol imidazolidone-2. This later product is particularly treacherous in commercial practice because of the unpredictability of its wide variation in degree of damage caused by chlorine retention. Chlorine retention in the methylol melamines takes the form of fabric yellowing.

Other disadvantages of prior art treating materials have been:
(1) lack of stability during storage and in the treating bath; (2) the tendency to form fishy odors on the finished fabric; (3) migration of the treating material on the fabric during drying, and (4) a lack of permanence to alkaline washing.

One important object of the present invention is to provide means for producing textile fabrics having a high degree of wrinkle resistance with a minimum loss of tear strength for a given degree of wrinkle resistance and without the other disadvantages listed above. Another important object of this invention is the provision of a wrinkle resistant fabric with good physical properties and without deleterious chlorine retention properties. Another object of this invention is the provision of a textile treating material capable of producing fabrics having a high degree of wrinkle resistance without causing excessive loss of tear strength and without imparting to treated fabrics the property of deleterious chlorine retention. Other objects of the invention will be apparent throughout this specification, the attached drawings and the appended claims.

In general, satisfactory fabric treatment can be accomplished by impregnating cellulosic fabric with from about 2 to 20% of its weight of a 1,3-dimethylol tetrahydro-2(1)-pyrimidone or of a 1,3-dimethyl tetrahydro-2(1)-pyrimidinethione in a water solution which also contains a catalytic quantity of an acidic catalyst, such as Catalyst AC (trademark of the Monsanto Chemical Company for its approximately 50% solution of 2-methyl 2-amino propanol hydrochloride), other amine hydrochlorides, organic acids, inorganic acids, ammonium salts, and certain metal salts, such as zinc nitrate, calcium chloride and magnesium chloride, and heating the thus impregnated fabric to effect drying of the fabric and curing of the resin.

In other instances where the starting fabric is known to be already weak and the above treatment of the fabric can be expected to lower the tear strength to a level of questionable commercial acceptance, it has been found desirable to add to the treating solution a small amount, as about 0.5 to 2%, of cationic softener (usually containing from about 25% to 50% solids), such as stearamido methyl pyridinium nitrate. As the amount of treating material is raised from 2% towards the 20% upper lever, the amount of crease resistance increases in almost direct proportion and the tear strength of the treated fabric is decreased in almost inverse proportion. As a practical matter, the amount of these materials best suited for ordinary fabric treatment appears to be between 3% and 10%, depending on the degree of wrinkle resistance desired, the initial strength of the fabric, and the ease with which the particular fabric construction chosen can be made wrinkle resistant.

The type of catalyst chosen to produce acidic conditions during the curing of the resin on the fabric does not appear to be critical. Catalyst AC has produced very satisfactory results both in the laboratory and on a commercial scale.

The steps of drying and curing can be separated or combined, depending on the processing equipment available. In those instances where the steps are combined, the heating temperature should be somewhere between 280° F. and the temperature at which the untreated fabric would be seriously deteriorated, which is about 380° F. for cotton. If the steps are separated, the drying temperature should be between about 175° and 300° F. for a time sufficient to reduce the moisture content of the fabric to below about 10% and the curing temperature should be about the same as the heating temperature for the combined drying and curing steps. In both instances, curing time is determined by the amount of time required to fix the 1,3-dimethylol tetrahydro-2(1)-pyrimidone (or pyrimidinethione) on the fabric under the chosen operating conditions. Fabrics treated with the pyrimidones in the above manner have been found to be highly wrinkle resistant and to possess uniformly low chlorine retention to the extent that they show as little or less strength loss than untreated otherwise identical fabrics when tested by the standard AATCC scorch test for chlorine retention (AATCC Tentative Test Method 69–52, Damage Caused by Retained Chlorine). All the treated fabrics had improved wrinkle resistance but the pyrimidinethiones did not appear to maintain the strength of the fabric against damage from retained chlorine.

This phase of the invention will be better understood by reference to the following typical examples showing preferred modifications of the invention:

Example 20

Mercerized cotton gingham fabric running about 4½ yards per pound was impregnated on a conventional "pad" set for a pickup of about 80% with a solution containing 11% of the product of Example 7 (about 6.5% 1,3-dimethylol tetrahydro 2-(1)-pyrimidone) and 1% Catalyst AC. The cloth was dried at approximately 200° F. to a moisture content of 5% and then cured at 350° F. for 80 seconds to fix the impregnated material. The fabric was washed to remove the catalyst and any unreacted material and dried. The thus treated fabric possessed a uniformly high degree of wrinkle resistance with tear and tensile strengths only slightly below those of untreated fabric. The treated fabric showed no deleterious chlorine retention properties when tested by the AATCC scorch test, had no discoloration before or after treatment with about 10% hot Clorox (commercial solution of about 5¼% sodium hypochlorite), developed no fishy odor on storage and retained these properties after repeated laundering under highly alkaline conditions.

Example 21

The fabric in Example 20 was treated as in Example 20 except that 2% of a stearamidomethyl pyridinium nitrate-methylol stearamide mixture was added and the amount of Catalyst AC was lowered from 1% to 0.5%. The fabric thus treated possessed the same properties as the product of Example 20, but had a much softer "hand" and a slightly higher tear strength.

Example 22

The fabric in Example 20 was treated as in Example 20 except that 2.5% 1,3-dimethylol tetrahydro-2(1)-pyrimidone was used rather than 6.5% and in addition 0.5% of a stearamidomethylpyridinium nitrate-methylolstearamide mixture was used. The treated fabric had a softness intermediate between that of the fabrics obtained in Examples 20 and 21, and was otherwise the same as the products of those examples.

Example 23

The cotton gingham of Example 20 was treated as in Example 20 with a water solution containing:

5% 1,3-dimethylol tetrahydro-2(1)-pyrimidone
0.5% of a mixture of stearamidomethylpyridinium nitrate and methylol stearamide Curing was effected at 320° F. for 100 seconds. The product was very similar to the fabric product of Example 22.

Example 24

The cotton gingham of Example 20 was treated as in Example 20 with a water solution containing:

15% of the product of Example 13
1% Catalyst AC
.5% of a mixture of stearamidomethylpyridinium nitrate and methylol stearamide Curing was effected at 280° F. for 2½ minutes. The product was very similar to the product of Example 20.

Example 25

The cotton gingham of Example 20 was treated as in Example 20 with a water solution of the following:

5% of the product of Example 13
1% Catalyst AC
0.5% Zelan AP (stearamidomethylpyridinium chloride)

The fabric product was most similar to the product of Example 21, but had a slightly lower wrinkle resistance.

Example 26

The cotton gingham of Example 20 was treated as in Example 20 with a water solution of the following:

5% of the product of Example 11
.5% Catalyst AC
1% of a stearamidomethylpyridinium nitrate-methylol stearamide mixture The product was very similar to the product of Example 20, but had a slightly softer hand.

Example 27

Prepared rayon gabardine was impregnated as in Example 20 with a water solution of the following:

15% of the product of Example 7
2% Catalyst AC

The fabric was dried as in Example 20 and cured at 330° F. for 6 minutes. The fabric was washed to remove the catalyst and any unreacted material and dried. The thus treated fabric possessed a high degree of crease resistance with tear and tensile strengths only slightly below those of untreated fabric. The treated fabric showed good resistance to shrinkage on laundering and showed no deleterious chlorine retention properties.

Example 28

The cotton gingham of Example 20 was treated as in Example 20 with a water solution of the following:

10% of the product of Example 12
1% Catalyst AC
1% of a stearamidomethylpyridinium nitrate-methylol stearamide mixture The fabric product was most similar to the product of Example 20, but was somewhat stiffer.

Example 29

The cotton gingham of Example 20 was treated as in Example 20 with a water solution of the following:

11% of the product of Example 18
1% Catalyst AC

The fabric product was most similar to the product of Example 20, but had a stiffer and crisper "hand."

*Example 30*

The cotton gingham of Example 20 was treated as in Example 20 with a water solution of the following:

12% of the product of Example 14
1% Catalyst AC

The fabric product was indistinguishable from the product of Example 20 in all respects.

*Example 31*

The cotton gingham of Example 20 was treated as in Example 20 with a water solution of the following:

12% of the product of Example 15
1% Catalyst AC

The fabric product was very similar in appearance to the product of Example 20. It also had wrinkle resistance and good strength properties, but when tested by the AATCC scorch test to determine the damage from retained chlorine, the product did not fall within arbitrarily-established commercially acceptable limits.

*Example 32*

The cotton gingham of Example 20 was treated as in Example 20 with a water solution containing:

12% of the product of Example 16
1% Catalyst AC

The fabric product was for all practical purposes completely indistinguishable from the product of Example 20.

*Example 33*

The cotton gingham of Example 20 was treated as in Example 20 with a water solution of the following:

12% of the product of Example 17
1% Catalyst AC

This fabric product was, for all practical purposes, completely indistinguishable from the product of Example 20.

*Example 34*

The cotton gingham of Example 20 was treated as in Example 20 with a water solution of the following:

30% of the product of Example 13
3% of a 40% solids polyacrylate emulsion (Hycar 4501)
1.5% Catalyst AC
1% of a 25% solids cationic softener (Ahcovel G)

The fabric product possessed the same properties as the product of Example 20, but had a much higher degree of wrinkle resistance and required little or no ironing after laundering.

Thus, it appears that the 4, 5 and 6 substituted tetrahydro-2(1)-pyrimidones are the full equivalents of the unsubstituted product insofar as treatment of textiles is concerned.

It will be obvious to one skilled in the art that the formulas used in the above examples can be modified without departure from the scope of the present invention to include crispening agents such as the usual thermoplastic vinyls and acrylics, gums, starches, and the like; other softening agents; waterproofing materials; dyes and the like.

I claim:

1. The method of producing tetrahydro-2(1)-pyrimidone which comprises heating 1 mol of urea and at least 1 mol of 1,3-diaminopropane to about the boiling point of 1,3-diaminopropane to form a normally solid product and thereafter heating said product at a higher temperature between the boiling point of said amine and the boiling point of tetrahydro-2(1)-pyrimidone for a sufficient time to form tetrahydro-2(1)-pyrimidone.

2. The process of producing a product having the formula:

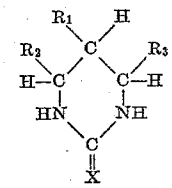

wherein $R_1$ is selected from the group consisting of hydrogen, hydroxy and lower alkyl, $R_2$ is selected from the group consisting of hydrogen and lower alkyl, $R_3$ is selected from the group consisting of hydrogen and lower alkyl and X is selected from the group consisting of oxygen and sulfur and wherein the total number of carbon atoms in all of said lower alkyl groups does not exceed six, which comprises heating to react 1 mol of a urea selected from the group consisting of urea, methyl urea and, thiourea with 1 mol of a diaminoalkane having at least three and no more than nine carbon atoms and in which the amino groups are attached to separate carbon atoms separated by one carbon atom, said heating being for a length of time and a temperature sufficient to produce said product, said temperature being above about 200° C. and below the decomposition temperature of the final product.

3. The method of producing a product having the formula:

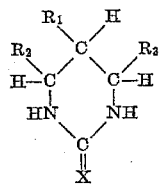

wherein $R_1$ is selected from the group consisting of hydrogen, hydroxy and lower alkyl, $R_2$ is selected from the group consisting of hydrogen and lower alkyl, $R_3$ is selected from the group consisting of hydrogen and lower alkyl and wherein the total number of carbon atoms in all of said lower alkyl groups does not exceed six, X is selected from the group consisting of oxygen and sulfur and wherein the total number of carbon atoms in all of said lower alkyl groups does not exceed six, which comprises heating 1 mol of a urea selected from the group consisting of urea, methyl urea and thiourea and at least 1 mol of a diaminoalkane having at least three and no more than nine carbon atoms and in which the amino groups are attached to separate carbon atoms separated by one carbon atom, said heating being carried out at about the boiling point of said diaminoalkane until a solid product is formed and thereafter heating the solid product at a higher temperature between the boiling point of said amine and the boiling point of said product for a sufficient time to form said product.

4. The method of producing a product having the formula:

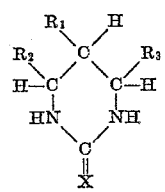

wherein $R_1$ is selected from the group consisting of hydrogen, hydroxy and lower alkyl, $R_2$ is selected from the group consisting of hydrogen and lower alkyl, $R_3$ is selected from the group consisting of hydrogen and lower alkyl and X is selected from the group consisting of oxygen and sulfur and wherein the total number of carbon atoms in all of said lower alkyl groups does not exceed six, which comprises heating 1 mol of a urea selected from the group consisting of urea, a lower alkyl urea, thiourea and a lower alkyl thiourea and at least 1 mol of a diaminoalkane having at least three and no more than nine carbon atoms and in which the amine groups are attached to separate carbon atoms separated by one carbon atom in the presence of an inert solvent having a boiling point above that of said diaminoalkane and below that of said product, said heating being at a temperature and for a time sufficient to produce said product, said temperature being above about 200° C. and below the decomposition temperature of the final product.

5. A cellulosic textile fabric of high wrinkle resistance being free of deleterious chlorine retention produced by the heat curing of a woven cellulosic fabric uniformly impregnated with an aqueous solution of 1,3-dimethylol tetrahydro-2(1)-pyrimidone containing catalytic quantities of $MgCl_2$ as acidic catalyst.

6. The process of producing tetrahydro-2(1)-pyrimidone which comprises heating about one mol of urea with at least about one mol of 1,3-diaminopropane at a temperature between about the boiling point of 1,3-diaminopropane and the decomposition temperature of said tetrahydro-2(1)-pyrimidone for a length of time sufficient to form tetrahydro-2(1)-pyrimidone.

7. The process of producing 1,3-dimethylol tetrahydro-2(1)-pyrimidone which comprises heating about one mol of urea with at least about one mol of 1,3-diaminopropane at a temperature between about the boiling point of 1,3-diaminopropane and the decomposition temperature of said tetrahydro-2(1)-pyrimidone for a length of time sufficient to form tetrahydro-2(1)-pyrimidone and thereafter reacting the resulting tetrahydro-2(1)-pyrimidone with formaldehyde.

References Cited in the file of this patent

UNITED STATES PATENTS

| | | |
|---|---|---|
| 2,339,203 | Stiegler et al. | Jan. 11, 1944 |
| 2,373,135 | Maxwell | Apr. 10, 1945 |
| 2,373,136 | Hoover et al. | Apr. 10, 1945 |
| 2,436,311 | Larson et al. | Feb. 17, 1948 |
| 2,517,750 | Wilson | Aug. 8, 1950 |
| 2,613,210 | Hurwitz et al. | Oct. 7, 1952 |
| 2,658,895 | Ballard et al. | Nov. 10, 1953 |
| 2,662,080 | Smith | Dec. 8, 1953 |
| 2,690,404 | Spangler et al. | Sept. 28, 1954 |
| 2,709,141 | Burks | May 24, 1955 |
| 2,795,513 | Rossin | June 11, 1957 |
| 2,804,402 | Williams | Aug. 27, 1957 |

OTHER REFERENCES

Richter's Organic Chemistry, vol. IV, 5 (1947).
Chemical Abstracts, vol. 44, p. 12846 (1950).